Oct. 20, 1931.  F. N. HOLMQUIST  1,827,846
APPARATUS FOR DISTILLING LIQUIDS
Filed Jan. 8, 1930  3 Sheets-Sheet 3
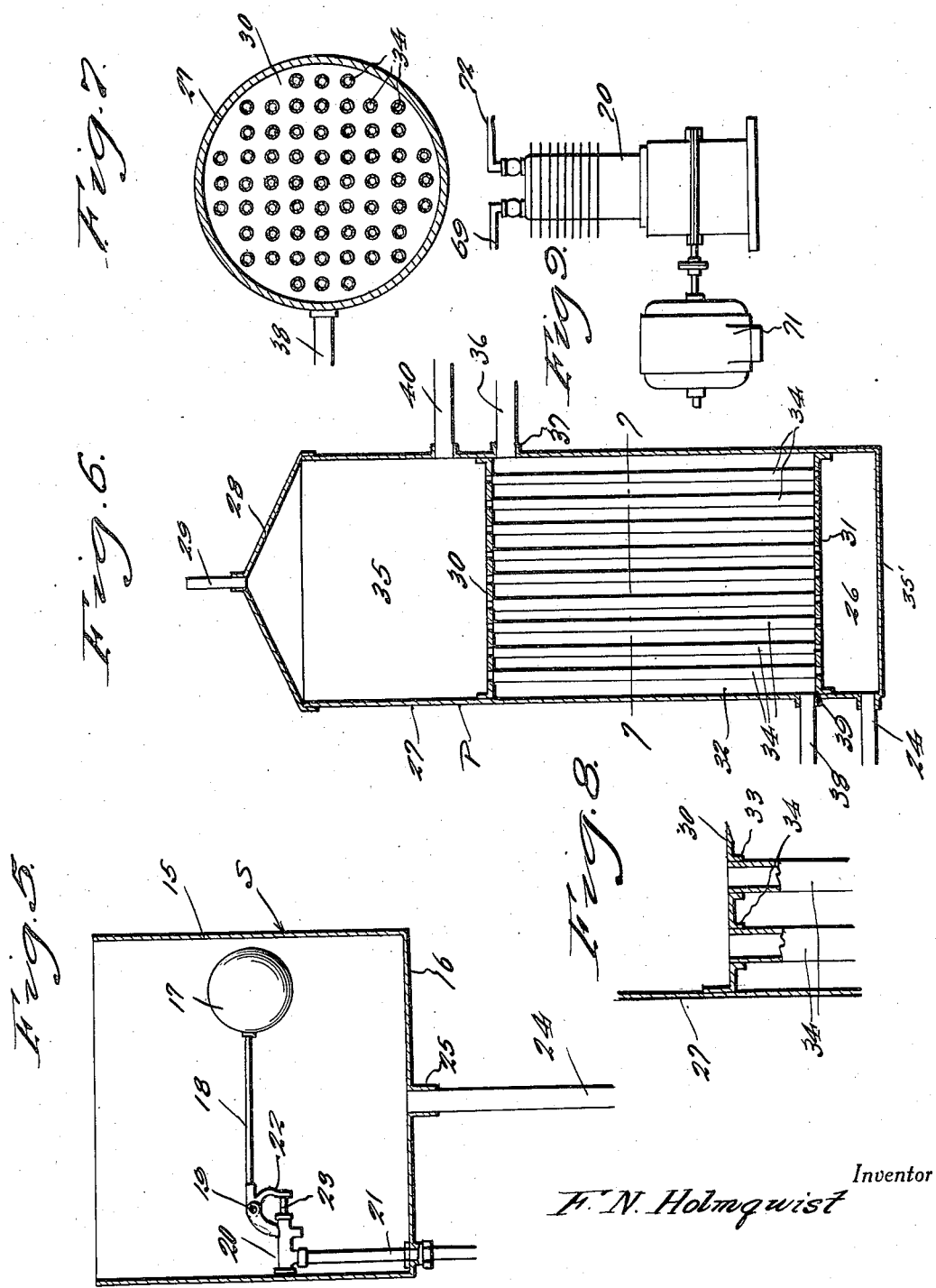
Inventor
F. N. Holmquist
By Clarence A. O'Brien
Attorney Patented Oct. 20, 1931

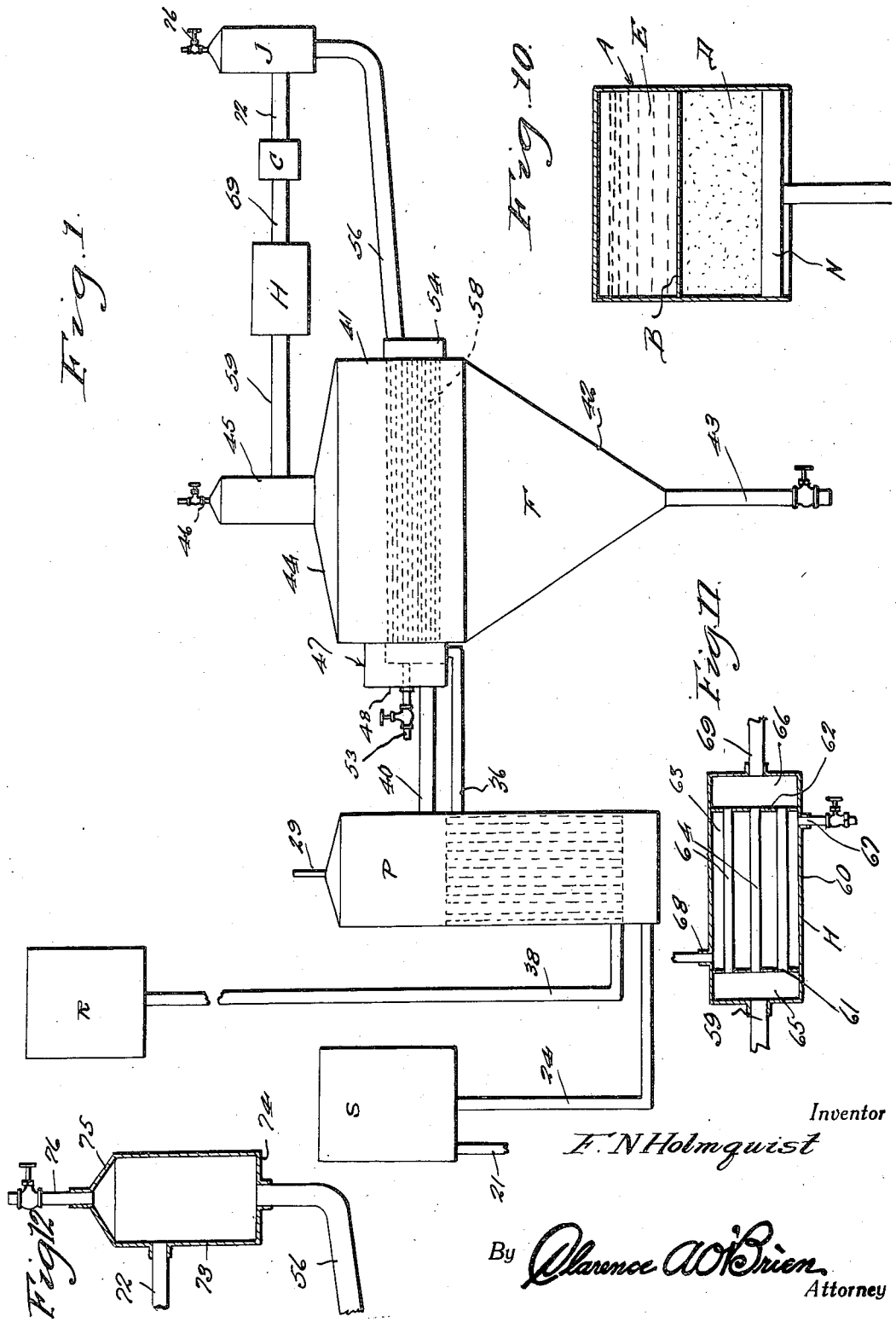

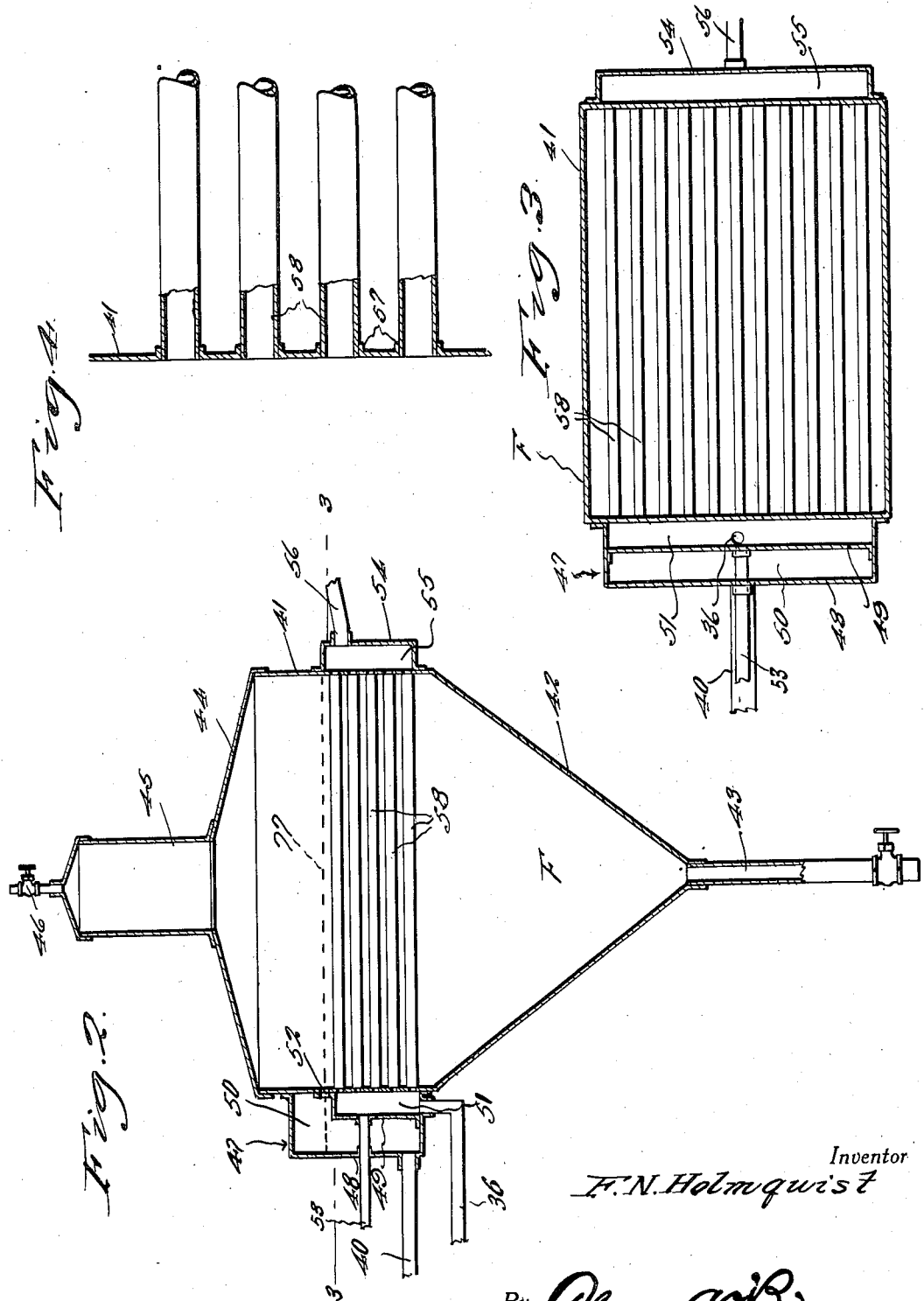

1,827,846

UNITED STATES PATENT OFFICE

FRED N. HOLMQUIST, OF PHOENIX, ARIZONA

APPARATUS FOR DISTILLING LIQUIDS

Application filed January 8, 1930. Serial No. 419,342.

This invention relates to apparatus and process for distilling water or other liquid without losing the latent heat of vaporization.

As is well known, impure or saline waters can be made potable by distillation, but on account of the large amount of heat required to vaporize water and the resultant high cost thereof, the process is not extensively used. It is believed that by using the process described herein, whereby the heat is conserved, that the cost of distilling water can be reduced to a point whereby it will be feasible to provide distilled water for ordinary domestic and other purposes.

In the ordinary process of distillation or evaporation, the latent heat of vaporization is entirely lost and as this represents such a vast amount of energy the cost of distillation is so high as to make the use of distilled water prohibitive for ordinary commercial or domestic purposes.

In my invention, I propose, with the expense of a comparatively small amount of energy, to recover all the latent heat of vaporization and use it to evaporate the raw water and in addition to use the hot, distilled water to pre-heat the cold raw water so that the net amount of energy consumed will be represented by that used in running a compressor, plus that represented by the difference in temperature between the raw water at the beginning of the process and the distilled water at the end of the process, plus the heat lost by radiation on account of imperfect insulation, plus minor losses due to removing the by-products of distillation, air, etc., and such minor losses as will result from the mechanical operation of the apparatus; all of which will be comparatively small.

These losses will be made up by the addition of heat supplied from an outside source and applied to the steam, the exact manner being immaterial.

Referring to the drawings in detail wherein like parts are designated by like numerals:—

Figure 1 is a diagrammatic view of the apparatus utilized in accordance with the present invention.

Fig. 2 is a vertical section in detail taken through the evaporator.

Fig. 3 is a horizontal section in detail taken substantially on the line 3—3 of Fig. 2.

Fig. 4 is an enlarged sectional elevation of a portion of the evaporator,

Fig. 5 is a vertical sectional view in detail of the supply tank,

Fig. 6 is a vertical detailed section thru the pre-heater,

Fig. 7 is a horizontal section taken substantially on the line 7—7 of Fig. 6,

Fig. 8 is an enlarged sectional detail of a portion of the pre-heater,

Fig. 9 is a side elevation of the compressor,

Fig. 10 is a diagrammatic view used in illustrating the principle of the present invention, Fig. 11 is a vertical section in detail through the heat exchanger, and Fig. 12 is a vertical section in detail through the air separator.

Referring to the drawings, S indicates the supply tank having an open top, circular side walls 15, and a bottom wall 16. The supply tank is supported by any suitable means, not shown, on substantially the same level as the evaporating chamber F, so that the level of the influent water in the latter will be controlled automatically.

This control of the water level in the evaporator chamber F is accomplished, in the form shown, by a ball float 17, on one end of a rod 18, that is pivoted as at 19, to a valve 20 on the inner end of the water supply pipe 21, that extends through the bottom 16 of the tank.

The rod 18 has a depending lug 22 thereon that presses a spring tensioned valve stem 23 inwardly when the level of the water in the evaporating chamber F falls below a certain determined point, which would be slightly above the condensing tubes, to be presently described, in the evaporating chamber F.

The supply pipe 21 admits the water to be distilled and the water flows from the supply tank to a conductor pipe 24, the upper end of which is welded or otherwise secured as at 25, and depends from the bottom wall 16. Of course, when the water in the evaporating chamber reaches a predetermined height, the valve 20 will close by the spring tension on the stem 23 and the weight is taken off of the ball 17.

The influent water to be treated flows from supply pipe 24 into the bottom compartment 26 of the vertically disposed drum of the liquid phase pre-heater P. The pre-heater P is formed with a circular side wall 27 on the upper end of which is welded or otherwise secured an inverted conical shaped top wall 28, from the apex of which projects a vent tube 29.

Intermediate the ends of the side walls are secured a pair of vertically spaced partition plates 30, 31 which form therebetween a sealed chamber 32 thru which circulates the effluent condensed water. Each of the plates 30, 31 have a plurality of alined openings therein about which are formed depending flanges 33 in which are welded or otherwise secured the opposite ends of the spaced vertically disposed tubes 34, that extend through the chamber 32.

Between the lower partition plate 31 and the bottom wall 35' is formed the compartment 26, and between the top partition plate 30 and the top wall 28 is formed a top compartment 35 which are in direct communication with each other through the tubes 34. It is to be noted that the upper compartment 35 is of greater area than the lower compartment 26, while the intermediate chamber 32 is greater in area than both.

One end of an effluent inlet conductor pipe 36 is secured to the side wall 27 as at 37, and communicates with the top of the intermediate chamber 32 while one end of the effluent outlet conductor 38 is secured as at 39 and communicates with the bottom of the chamber 32, on the opposite side from the inlet pipe 36. The other end of the effluent conductor 38 extends into the open distilled water receiving tank R. One end of the influent discharge pipe 40 is secured to the side wall 27, close to the top partition plate 30, and communicates with the bottom of the top compartment 35.

The evaporator is indicated at F and consists of a closed shell with an intermediate portion 41 rectangular in cross section, the side walls of which merge with an inverted pyramidal-shaped bottom 42, that has a valve controlled drain pipe 43 for cleaning the evaporator.

The intermediate portion 41 merges with the top wall 44 from the center of which projects an air separating dome 45, that has a valve controlled vent pipe 46. The dome 45 communicates with the interior of the shell.

A header on one end of the evaporator F is indicated at 47 and is formed with an outer wall 48 that extends across the end of the intermediate portion 41. A partition wall 49 extends longitudinally of the outer wall 48 and within the compartment 50 formed between the wall 48 and the wall of the shell.

Between the inner wall 49 and the wall of the shell, there is formed a compartment 51 which is not as high as compartment 50 leaving a space thru which the influent opening 52 connects compartment 50 with the interior of the intermediate portion 41 of the shell.

The influent conductor pipe 40 is secured to the header wall 48 and communicates with the bottom of the compartment 50, while the effluent pipe 36 is connected with compartment 51. A valve controlled pipe 53 extends through header wall 48, is connected to wall 49, and communicates with compartment 51 for conducting steam from an extraneous source (not shown), into the evaporator, when beginning a run.

Another header 54 is secured to the opposite end of the intermediate portion 41 of the shell, and forms a compartment 55 which is alined with compartment 51. One end of an effluent conductor pipe 56 is connected to the header 54 and communicates with the compartment 55.

The end walls of the intermediate portion 41 of the shell are provided with a plurality of alined openings and the end walls are formed with inwardly directed flanges 57 about a plurality of openings in which are welded the opposite ends of a plurality of tubes 58.

These plurality of tubes 58 receive the effluent vapor and serve as a condenser therefor. The openings are confined within compartments 51 and 55 and the tubes 58, which are in spaced horizontal relation, form direct communication between the two compartments, to form a sub-chamber within the intermediate portion 41 of the shell, that is in heat exchange relation with the influent water in the interior of the evaporator.

The tubes 58 and 34 are made as thin as possible so as to exchange heat very freely. Leading from an intermediate portion of the dome 45 is an influent conductor pipe 59 that communicates with one end of a super-heater indicated at H. As shown in Fig. 11, the super-heater is a hollow cylinder 60, the interior of which is divided by a pair of spaced, diametric, partition walls 61, 62, to form a central heating compartment 63, through which extends spaced tubes 64 that communicate with end compartments 65, 66 formed between the end walls and the respective partition walls 61, 62.

A valve controlled inlet pipe 67 communicates with the central compartment 63, and an exhaust pipe 68 carries the exhaust therefrom. The heat through the super heater is to be supplied by any extraneous source. An influent conductor pipe 69 connects the end compartment 66 and the compressor C.

The compressor C includes a conventional cylinder 70, in which is mounted the convendrawn through the super-heater H, thence to the compressor where it is compressed and discharged into J. Now the compressed, super-heated, effluent vapor has a higher condensation point and a higher temperature than the influent liquid or vapor.

It therefore follows that in the heat exchange, in the evaporator F, heat will flow from the effluent to the influent liquid causing it to vaporize.

From the foregoing description, it will be apparent that the basic feature of the invention, that is for distilling water or other liquids, consists in preheating the influent liquid with hot distilled liquid, evaporating the influent liquid with the effluent superheated, compressed vapor which heat exchange totally condenses the effluent vapor to a liquid. Thereafter, super-heating the influent vapor and compressing the same to raise the temperature and increase the boiling or condensation point of the influent vapor.

All the apparatus used in connection with this invention is thoroughly insulated from heat loss by asbestos covering or other stock conducting material. The boiling point of water at a pressure of 14.7 pounds per square inch (atmospheric) is 212° and the latent heat of vaporization of a pound of water at 212° Fahrenheit, and atmospheric pressure of 14.70 pounds per square inch is 970.4 B.t.u. If the pressure of the steam or vapor in compressor C is increased, to say, twenty pounds per square inch, the boiling point or condensation point of the same pound of water is raised to approximately 228° Fahrenheit, and contains 960 B.t.u. latent heat.

The significant factor of this phenomena as applied to this invention is that the boiling or condensing point of the influent vapor is increased by the compressor which makes possible a heat exchange in the evaporator F between steam at say 228° Fahrenheit, and the influent water at 212°.

Moreover, the effluent vapor in tubes 58 will condense at a higher point than at atmospheric pressure, which liquefies the steam at higher temperatures. The advantages of the principle of operation is better understood by referring to the diagrammatic view in Fig. 10, wherein A is a hollow cylinder, B is a thin partition separating the cylinder into two parts D and E, N is a piston which can move up or down without leakage.

Assume that there is a pound of water at 212° F. in compartment E and in D a pound of saturated steam at 212° F. Under these conditions, there is no tendency for heat to leave the steam in D to go into the water in E, the temperature being the same although the pound of steam at 212° F. contains 970.4 more heat units than the pound of water at the same temperature, and the steam remains steam and the water remains water.

If the 970.4 B.t.u.'s heat units can be taken from the steam and put into the water, then the steam will become water and the water will become steam. This can be accomplished by moving the piston C upward, thus compressing the steam D and thereby raising its temperature. The slightest increase in pressure will raise the temperature of the steam and heat will at once begin to flow from the steam into the water thus causing the water to vaporize and the steam to condense.

If the piston N is moved slowly upwardly until it reaches B, all of the steam will have been condensed into water and practically all the water turned into steam, a small amount being left because the condensed steam or water in E will have a temperature slightly in excess of 212° F. If the piston be pushed up more rapidly so as to produce and maintain a pressure of, for example twenty pounds per square inch on the steam in P, the temperature of this steam will be at once raised to 228° F. and the heat will flow much more rapidly from the steam into the water until all the steam is condensed and practically all the water evaporated.

In this case, the temperature of the condensed steam or water in E will be 228° F. but if it is held against the partition B sufficiently long, it will cool to 212° F. and practically all the water in D will be vaporized.

It is understood, that by describing in detail herein any particular form of the invention, structure, arrangement or sequence of operation, it is not intended to limit the invention beyond the terms of the claim, or the requirements of the prior art.

Having thus described my invention, what I claim as new is:—

A distilling apparatus of the class described comprising a chamber having a dome at its upper end, a plurality of horizontal tubes passing through an intermediate portion of the chamber, inlet and outlet headers connected to the sides of the chamber and in communication with the tubes, a superheater, a pipe connecting the same with the dome for leading the vapors from the dome into the superheater, a compressor connected to the superheater for compressing the vapors passing therefrom, an air separator chamber, a conduit connecting the same with the compressor, a valve control vent in the top of the separator, a conduit connecting the bottom of the separator with the inlet header, a valve control vent in the top of the dome, a second header enclosing the outlet header, said chamber having a port therein for connecting it with the second header, a cylinder, tube sheets therein dividing the same into three chambers, tubes having their ends connected with the sheets and said tubes, placing the chambers at the ends of the cylinder in tional compressing piston not shown in the drawings, which is driven by a prime mover, such as an electric motor 71, and leading from the discharge or compressed sides of the cylinder, is an influent conductor pipe 72 that leads into and is connected with the air separator.

The air separator J includes a closed, hollow cylinder 73 with a bottom wall 74 and a frusto-conical dome 75 from which the valved vent pipe 76 projects. The interior of the air separator is an open compartment in which the air in the influent super-heated, compressed, vapors has ample time to rise to the top from which it can be discharged through the valved vent pipe 76. The compressed vapor, then passes from J through the conductor pipe 56, the outer end of which is connected with the bottom wall 74 of the air separator.

While the specifications describe a superheater, the process of supplying additional heat may be done in another manner. For example, if the apparatus is being used for distilling water, additional heat can be supplied simply by introducing live steam into 72, J, 56 or 54, said steam itself being distilled water when it condenses.

Practically all water contains some air or other gases in solution. Unless this air is removed the apparatus would not properly function. For example, this air will not condense as does steam and such air as has entered the tubes 58 might remain there and cool to a temperature of the water in F, so that there would be no heat exchange and the apparatus would go static.

It therefore follows that the air separator J and the dome 45 permit the air to be separated from the steam or vapor through the outlet vent pipes 46 and 76.

Furthermore, the effluent receiving tank R is disposed at a height above the level of the water in compartment 51 so as to balance the pressure caused by compressing the steam at C. For example, if the pressure after compression is twenty pounds absolute, and the atmospheric pressure is 14.7 pounds absolute, the amount of compression would be 5.3 pounds per square inch, which is equivalent to a head of 12.2 feet of water. Therefore, a weir or other opening in R would have to be 12.2 feet higher than the level of the water in compartment 51 to balance the pressure and prevent blowing the water out of the system.

Moreover, the apparatus has been illustrated and described with a reciprocatory compressor, it is within the contemplation of the invention to use a centrifugal compressor which will furnish a constant pressure. Also, it would be possible to have such a centrifugal compressor driven by a direct connected steam turbine and then discharging the exhausted steam from the turbine into the compressed steam, thus providing the additional heat required and eliminating the need for a superheater.

From the air separator J, the vapor or liquid is to be considered effluent and from this point begins the effluent cycle. The following cycle of operation will teach the invention.

The float valve 20 is adjusted with respect to the level of the liquid in the evaporator H, so that the liquid in the latter will not fall below the level of the tubes 58, and as near as possible to the level indicated, the apparatus is ready to begin its operation.

Steam is introduced in the beginning, into the tubes 58 through pipe 53, which may be connected to any outside source. This steam is allowed to enter until the water in F boils and all the air is driven out by the steam thus formed through the valves 46 and 74.

The super-heater H is placed in operation by turning on the steam in the compartment between the partition plates 61, 62 which will heat the influent steam as it passes through the tubes 64 in the super-heater, after this steam has passed up the dome 45, and out through the conductor 59.

The super-heated steam, is then compressed by compressor C, which compression increases its temperature and raises its boiling (condensation) point. From C it passes through the air separator, through the conductor pipe 56 into the chamber 55 and thence into the tubes 58 where it is in heat exchange relation with the influent water in F outside the tubes, and being hotter than the influent water, gives up its heat to it causing it to vaporize, and the effluent steam in the tubes will be condensed to a liquid by this heat exchange.

The effluent vapor is wholly condensed to a hot liquid in the condensing tubes 58, by a heat exchange with the influent liquid.

The effluent liquid from the evaporator passes through pipe 36, to the compartment 32, of the pre-heater P and out of the pipe 38 to the receiving tank R. The influent liquid of the supply tank S will begin to flow as soon as the temperature in the evaporator F is such that the charge therein has begun to vaporize, and the supply of steam through 53 to the evaporator F may be turned off as the system begins to operate automatically.

As the system begins to circulate, there will be two exchanges of heat between influent and affluent liquid or vapor. One which is in the liquid phase in the pre-heater P, and the other in the evaporator F which is between the effluent vapor and the influent liquid. Under automatic operation, the influent liquid in the evaporating chamber absorbs the heat from the condensing tubes 58, causing the influent liquid to boil and the effluent vapor to condense therein. Now the influent vapor from the boiling liquid is communication with each other, a pipe connecting one of said chambers with the second header, a pipe connecting the outlet header with the chamber between the two sheets, an elevated receiving tank, a pipe connecting the same with the chamber between the two sheets, a tank, a pipe connecting the bottom of the tank with the third chamber in the cylinder whereby water from said tank will enter the third chamber of the cylinder and pass through the tubes therein into the other end chamber, and from this latter chamber, the water will flow through the connected pipe into the second header into the chamber where the water will be vaporized by the heat of the condensed vapors flowing through the tubes in said chamber and such vapors will pass into the dome and the vapors passing through the tubes in the chambers will be condensed and passed through the outlet header through the connecting pipe into the tube chamber of the cylinder and from this chamber the condensed water will pass into the elevated tank, means for supplying water to the tank which is connected to the third chamber and means for regulating the water level in said tank, said tank being so located relative to the chamber to control the water level in the said chamber.

In testimony whereof I affix my signature.

FRED N. HOLMQUIST.